US006757586B2

(12) United States Patent
Milojevic et al.

(10) Patent No.: US 6,757,586 B2
(45) Date of Patent: Jun. 29, 2004

(54) MULTIPLE ARM ROBOT ARRANGEMENT

(75) Inventors: Dragoslav K. Milojevic, Windsor (CA); John K. Ashworth, Lake Orion, MI (US); Jan T. Nielsson, Auburn Hills, MI (US)

(73) Assignee: ABB Automation Inc., New Berlin, WI (US)

( * ) Notice: Subject to any disclaimer, the term of this patent is extended or adjusted under 35 U.S.C. 154(b) by 0 days.

(21) Appl. No.: 09/947,142

(22) Filed: Sep. 5, 2001

(65) Prior Publication Data

US 2003/0045967 A1 Mar. 6, 2003

(51) Int. Cl.[7] .............................................. G06F 19/00
(52) U.S. Cl. ...................... 700/245; 700/247; 700/249; 700/258; 700/261; 700/264; 318/302; 318/305; 318/313; 318/326; 318/568.19; 318/668; 318/41; 318/42; 219/110; 219/121; 427/140; 427/142
(58) Field of Search ................................. 700/245, 247, 700/258, 261, 264, 249; 219/89, 110, 121.63, 121.78, 121.79; 318/568.19, 305, 313, 302, 326, 668, 708, 621, 308, 324, 686; 901/41, 42; 222/473, 153.01, 166, 559

(56) References Cited

U.S. PATENT DOCUMENTS

| | | | | |
|---|---|---|---|---|
| 4,531,192 A | * | 7/1985 | Cook | 700/258 |
| 4,842,475 A | * | 6/1989 | Driels | 414/730 |
| 5,321,225 A | * | 6/1994 | Boyer | 219/110 |
| 5,769,949 A | * | 6/1998 | Cienkus et al. | 118/621 |
| 6,071,346 A | * | 6/2000 | Yamauchi et al. | 118/302 |
| 6,192,604 B1 | * | 2/2001 | Morrison | 34/666 |
| 6,206,250 B1 | * | 3/2001 | Boers | 222/473 |
| 6,309,464 B1 | * | 10/2001 | Anfindsen | 118/668 |
| 6,317,953 B1 | * | 11/2001 | Pryor | 29/407.04 |
| 6,365,221 B1 | * | 4/2002 | Morton | 427/140 |

FOREIGN PATENT DOCUMENTS

JP  08243959 A  *  9/1996

OTHER PUBLICATIONS

Morley, Inc, Painting trucks at general motors; The effectiveness a complexity–based approach, 1986, Internet, pp. 35–58.*
Kline Jr, Automotive Finishing Online, Maximizing paint shop efficiency, 2000, Internet, pp. 1–6.*
AXO–SCINTEX & Staubli (France); Metal coating painting application without masking, 1998, Internet, pp. 1–2.*
Nordson Corp., Automation: To what degree?, 2001. Internet, pp. 1–5.*

* cited by examiner

Primary Examiner—William A. Cuchlinski, Jr.
Assistant Examiner—McDieunel Marc
(74) Attorney, Agent, or Firm—Harness, Dickey & Pierce, P.L.C.

(57) ABSTRACT

An improved robot arrangement for performing predetermined tasks, such as paint finishing, features equipping a robot with a plurality of manipulatable arms, with at least two of the arms performing like operations. Alternatively, a plurality of commonly controlled manipulator arms may be provided by clustering a plurality of conventional single arm robots on a common mounting stand.

8 Claims, 6 Drawing Sheets

MULTIPLE ARM ROBOT ARRANGEMENT

BACKGROUND OF THE INVENTION

The invention relates generally to improvements in robotic systems performing automated manipulated functions on workpieces such as automotive vehicle bodies. More specifically, the invention pertains to robotic paint finishing of such objects in automatic paint finishing lines of high capacity.

Conventional robotic automotive paint finishing booths, such as that depicted in FIGS. 1a and 1b utilize multiple paint atomizers as well as robots or reciprocator machines in order to distribute paint across all required surfaces of the object passing through the paint application booth.

The paint application process can be performed either on a moving or stationary object, such as a car body. In either case, the object is indexed down the finishing line after the paint application process is complete. FIGS. 1a and 1b set forth a top and cross-sectional view, respectively, of a paint application zone 104 in a paint spray booth 100. Six robots 102a–f, three on each side of the paint application zone 104, each carry a paint application or distribution device 107a–f, such as a rotary bell, carried on a single manipulator arm or arm assembly 103a–f. Conventionally, an automotive chassis 106 is conveyed by a conveyor system 108 down the center of the spray booth through application zone 104 and is painted by the sets of three individual robots with single manipulator arms stationed on either side of the conveyor system 108.

Conventional paint robots 102a–f as shown in FIGS. 1a, 1b typically respectively consist of a base segment 105a–f which can be stationary or movable in the direction of conveyor system 108 and an arm assembly 103a–f comprising a vertical arm segment, a horizontal arm segment and a wrist segment holding the paint application device 107a–f.

The term "arm", as used herein, is intended to encompass either a manipulator arm composed of a single arm element or an assembly comprising a multi-segment arm, where pairs of the segments may be interconnected by joints as shown in FIGS. 1a, 1b.

Such a prior art arrangement has the favorable features of repeatability of design, spare parts and maintenance; lower programming effort for identical robot units; and favorable downgrade arrangements should one of the robots fail. However, the prior art arrangement also presents important disadvantages. All robots are of the largest size required to paint the highest and the furthest portions of the object from the paint distribution devices, for example, the roof of the car body 106 shown in FIGS. 1a, 1b. Additionally, the maximum reach envelope of each robot 102 must be capable of covering both the lowest and the highest point of object 106. This, in turn, requires that all robots 102a–f be equipped with the largest required reach envelope.

An additional disadvantage of the prior art arrangement is that the combined effect of large envelope and high paint applicator relocation speed requires a sturdier robot to cope with the static and dynamic loads that it must handle which, in turn, results in higher total system cost. Also disadvantageous is the fact that the robots 102 require a relatively wide booth in order to paint vertical surfaces on object 106, due to the length of the manipulator arms of the robots. The robots 102 require space, either in front or at the back, in order to position the paint application device, such as an atomizer 107, at a suitable spraying distance in front of the surface to be painted.

Additionally, robots 102 often must be moved forward or backward along the line in order to paint the lower portions of part 106, such as a rocker panel, which requires a relatively longer spray booth paint application zone 104, along with an additional traveling axis (also known as the X-rail) being provided for robot movement longitudinally along application zone 104.

Finally, another disadvantage of the prior art arrangement is that at least two of the robots 102 perform very simple operations of reciprocating in the vertical surface of part 106. A much simpler machine than a full 7-axis robot can perform this operation.

SUMMARY OF THE INVENTION

Accordingly, in a first aspect of the invention, in a robot for performing predetermined operations under direction of a controller, the invention provides an improvement whereunder the robot is equipped with a plurality of manipulatable arms with at least two of the plurality of arms performing like operations.

In another aspect of the invention, a robotic system for performing predetermined operations under direction of a controller utilizes a cluster comprising a plurality of single manipulator arm robots such that each of the plurality is coupled to a common mounting stand, with at least two of the plurality of arms performing like operations.

In yet another aspect of the invention, a paint finishing booth having a paint application zone utilizes an arrangement of paint application robots wherein a robot cluster has a plurality of commonly controlled manipulator arms, each equipped with at least a paint application device and positioned within the paint application zone of the booth for applying paint at a first side of a workpiece being transported through the application zone.

In still a further aspect of the invention, a robotic system for performing predetermined operations under direction of a controller utilizes a cluster of single manipulation arm robots such that at least two bases of the robots extend in different directions toward a mounting end of their respective manipulator arms.

BRIEF DESCRIPTION OF THE DRAWING

The objects and features of the invention will become apparent from a reading of a detailed description, taken in conjunction with the drawing, in which:

FIG. 1b is a cross-sectional view of the booth of FIG. 1a;

FIG. 2b is a cross-sectional view of the booth of FIG. 2a;

FIG. 3b is a cross-sectional view of the booth of FIG. 3a;

FIG. 3d presents details of the mounting arrangement for the robot cluster on the opposite side of the booth of FIG. 3a;

FIG. 4b is a cross-sectional view of the booth of FIG. 4a;

DETAILED DESCRIPTION OF THE PREFERRED EMBODIMENTS

Figure 2A:
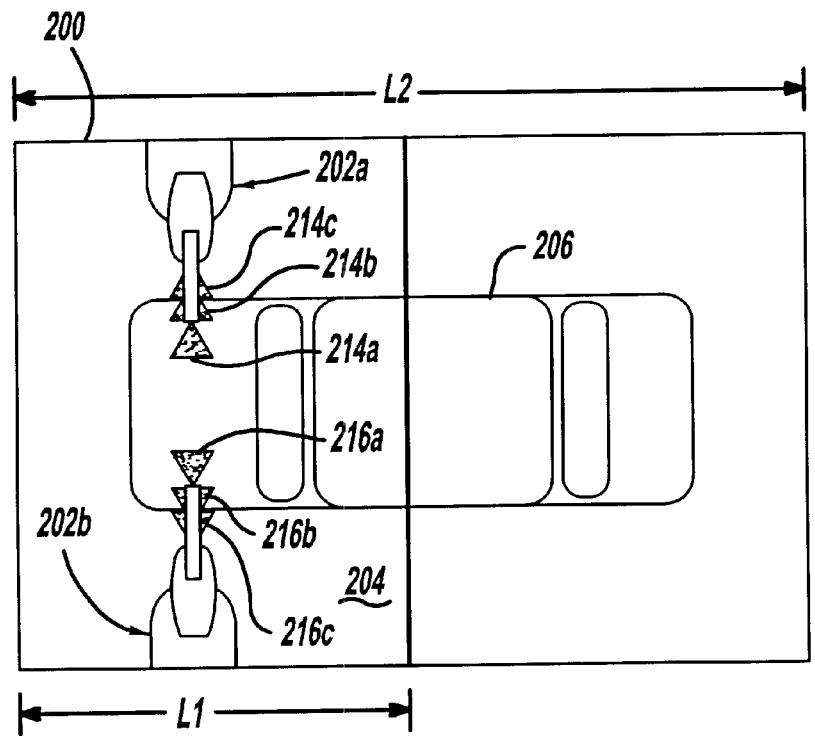
FIG. 2a is a top plan view of a paint application booth arranged in accordance with a first embodiment of the invention.
Figure 2B:
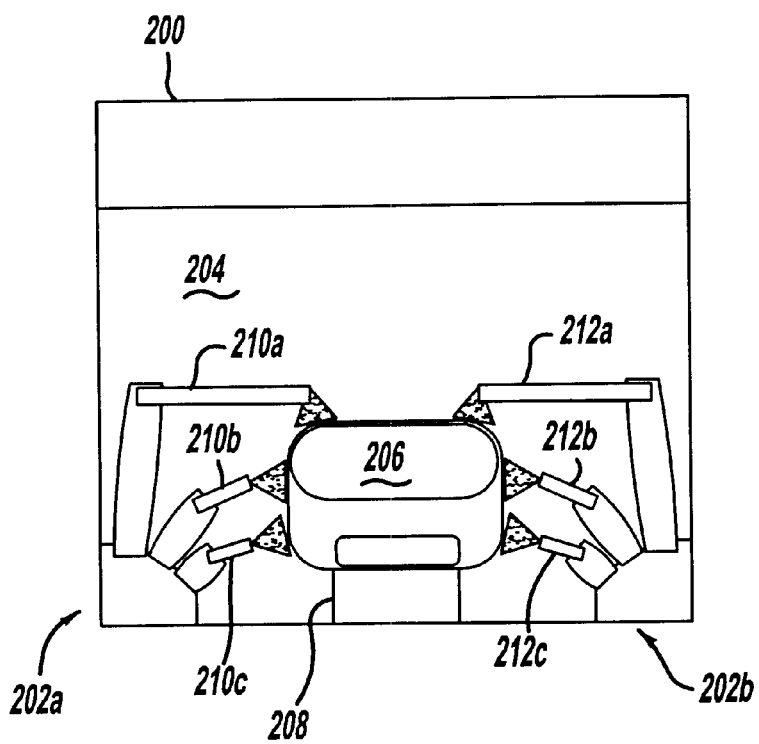

With reference to FIGS. 2a and 2b, a first embodiment of a robotic multi-arm arrangement in conformance with the invention is set forth. Paint spray booth 200 encloses a paint application zone 204 along which workpieces such as automotive bodies 206 are transported by a conveyor system 208.

Positioned within paint application zone 204 on opposite sides of the conveyor system 208 are first and second clusters of robot arms or arm assemblies 202a and 202b. In the embodiment of FIGS. 2a and 2b each robot 202a and 202b is equipped with a plurality, in this specific example 3, manipulator arms. Robot 202a has arms or arm assemblies 210a, 210b and 210c associated therewith, while on the opposite side of the booth 200 robot 202b is equipped with manipulator arms 212a, 212b and 212c. Each of the arms 210 and 212 carry at their extremities or wrists a paint application device, such as a rotary bell or other conventional paint application element. Arm 210a carries paint application device 214a, arm 210b carries device 214b and arm 210c carries device 214c. Similarly, robot 202b has paint application device 216a mounted to arm 212a, device 216b mounted to arm 212b and device 216c mounted to arm 212c. While arms 210a–c and 212a–c are shown as having two hinged segments, it is to be understood that in all embodiments described herein such arms could comprise single segments, or more than two segments.

Figure 1A:
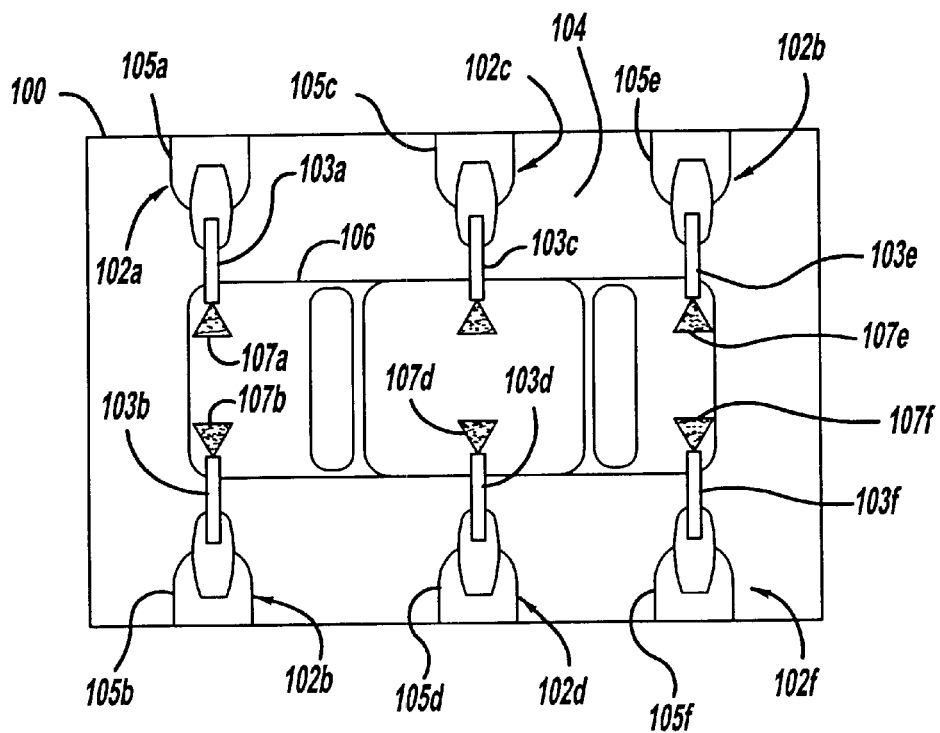
FIG. 1a presents a top plan view of a paint application booth arranged in accordance with prior utilization of single arm robots.
Figure 1B:
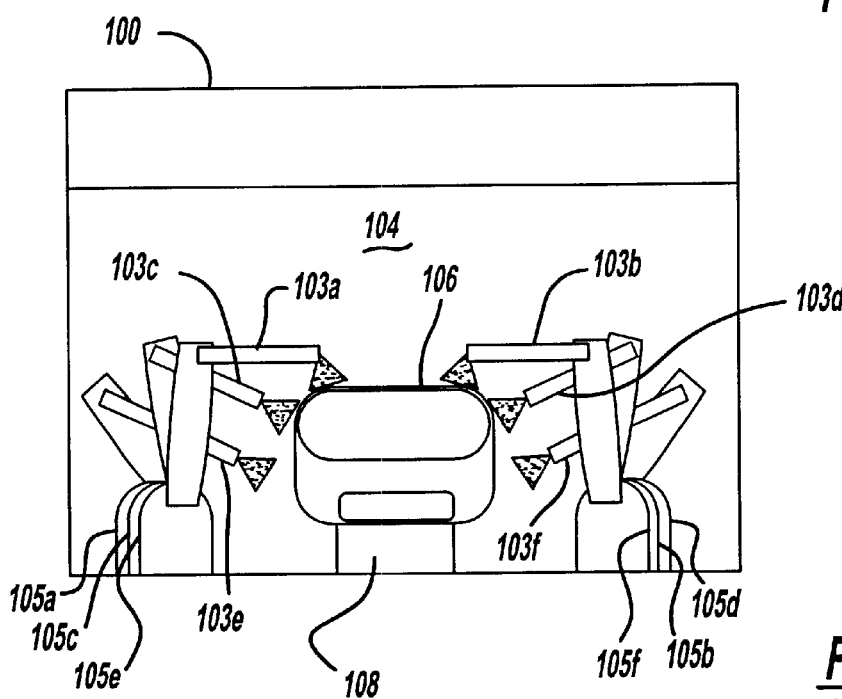

Placing each cluster of commonly controlled manipulator arms in a common substantially vertical plane substantially reduces the length L1 of paint application zone 204 in comparison to the length L2 which would be required for the prior art arrangement set forth in FIGS. 1a and 1b. This is due to the fact that the arrangement in accordance with the invention reduces the length of the required spray zone by assigning the portions of the part 206 to be coated by individual applicators in a vertical plane rather than in a horizontal direction along the spray booth as shown in the conventional arrangement of FIGS. 1a and 1b.

Such multiple manipulator arm clusters are referred to herein as "spider" or "octupus" robots. As with the conventional robots 102 of FIG. 1a, each arm associated with robots 202 of FIG. 2a may comprise a vertical, a horizontal and a wrist segment. However, the arms and segments are in different lengths, with the option of adding arms in still different sizes to each cluster depending on the portion of the object 206 surface to be painted by a specific arm. Compared to the conventional arrangement of FIGS. 1a, 1b, the arrangement of FIGS. 2a, 2b incorporates a different split of work areas of the individual robot arms 210 and 212. The robots 102 in FIGS. 1a, 1b are positioned along the longitudinal extent of the spray booth 100, and these robots split their work areas according to the front, middle and rear portion of the object 106 to be coated. In this prior art arrangement, each robot is able to paint top (horizontal) surfaces, as well as middle and low vertical surfaces of the vehicle body 106. Each robot 102 requires space for its working envelope, and this results in a spray booth length requirement (L2 of FIG. 2a), typically 30 feet and longer for an arrangement with six robots, three on each side of the booth. This relatively long spray booth requires a high cost of equipment investment, including ventilation air supply and exhaust, as well as environmental pollution control equipment.

The arrangement in accordance with the embodiment of FIGS. 2a, 2b requires a much shorter spray booth length L1, typically one-half of the length L2 required for the prior art arrangement. If even shorter arms of the robot arrangement in FIGS. 2a, 2b are used for lower vertical surfaces of vehicle body 206 (which surfaces are the closest ones to the base of the robots 202) the width of the booth is also smaller, since the robots 202 do not require space for their elbows rearwardly of the robot base. The individual arms 210 and 212 have reach envelopes which do not have to be as large as those envelopes required for the prior art arrangement of FIGS. 1a, 1b. Each arm has a limited work area, and it should not interfere with the other arms, due to their different sizes, as illustrated in the cross-sectional view of spray booth 200 in FIG. 2b. Adding additional multiple arm robot sets along the spray booth, if the capacity of the line so requires, should not pose additional problems.

Hence, the embodiment of FIGS. 2a, 2b offers the advantages of reduced booth length, reduced booth width and less longitudinal activity requirements for the robots 202, since they operate mostly directly in front of their own bases. However, if required by a certain application to optimize the paint finishing process, robots 202 could be mounted on a longitudinal rail.

Additionally, the embodiment of FIGS. 2a, 2b makes possible economical retrofits of the multi-arm clusters in existing shorter paint booths in older automotive assembly plants having stationary or slightly oscillating paint applicators. This enables the addition of the highly flexible robotic system without requiring adding length to the finish line. The approach will considerably increase the flexibility of the paint finishing line for new style vehicles coming in a variety of sizes. The embodiment of FIGS. 2a, 2b further contributes to flexibility of the system through use of robot programming.

The embodiment of FIGS. 2a, 2b illustrates a principal concept of the invention of providing multiple manipulator arms under common control of the robot, where the arms are all coupled to the same robot base. This approach may be limited in some applications, both in the working envelopes of the robot arms and in the availability of specifically required arm lengths in practical process arrangements. Hence, it is important to consider alternative embodiments which may, in some cases, allow more flexibility in motion of the individual manipulator arms, allow application of different arm lengths without interfering with each other, and use conventional robot modules in order to combine them into a multiple arm robot solution.

With reference to FIGS. 3a, 3b, 3c and 3d, a first alternate embodiment will now be described. The embodiment of FIGS. 3a–3d is based on a combination of a plurality (in this specific example 3) of single arm or arm assembly robots mounted to a common mounting stand.

As used herein, "common mounting stand" is intended to encompass not only the single mounting stands set forth in the drawing, but also slightly separated stands grouped in a cluster with a separation distance between attachment points of the root arms of each robot being less than the length of the longest arm segment of all the arm assemblies in the cluster.

Likewise, the term "common controller" or "controller" is intended to encompass not only a single robot controller, but also a plurality of coordinated controllers, each controlling the motion of the individual robots within a cluster.

The invention additionally contemplates separate mounting stands within a cluster, wherein each robot base is mounted such that at least two of the bases extend in different directions toward a connection with their respective arms.

Booth 300 has a first manipulator arm cluster 302a and a second manipulator arm cluster 302b positioned at opposite sides of a conveyor system 308 which transports workpieces such as automotive bodies, 306 along a central portion of booth 300 through a paint application zone 304.

Figure 3A:
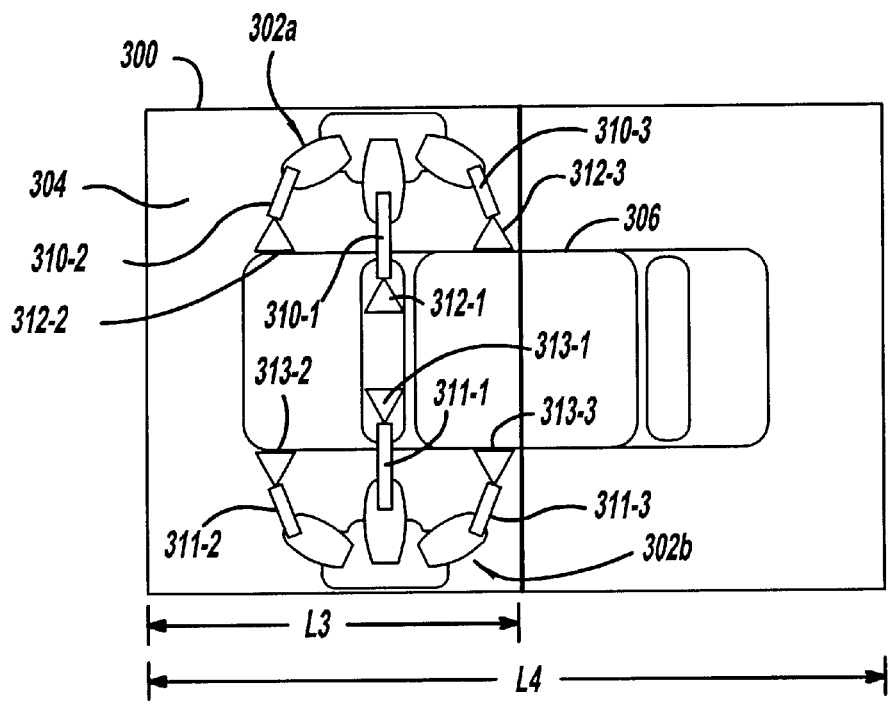
FIG. 3a is a top plan view of a booth arranged in accordance with a second embodiment of the invention.
Figure 3B:
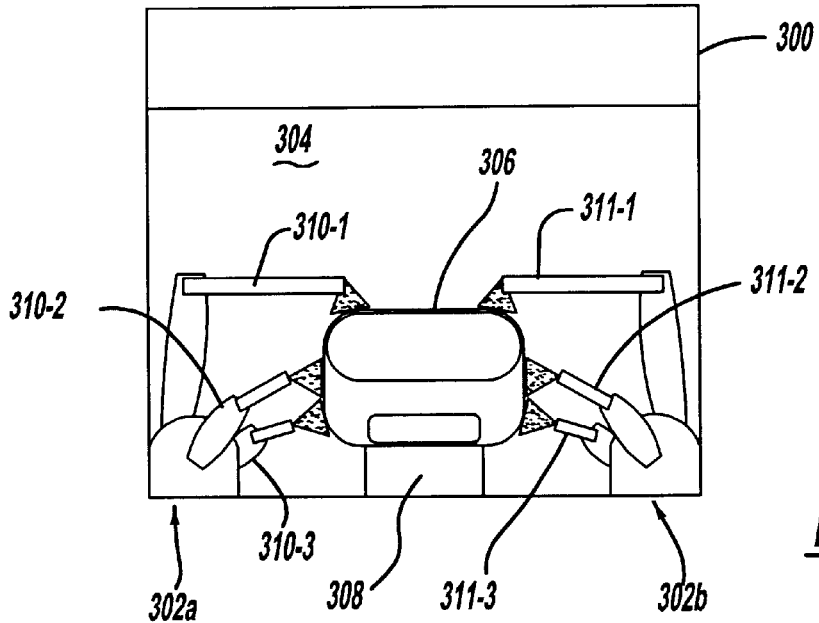
Figure 3C:
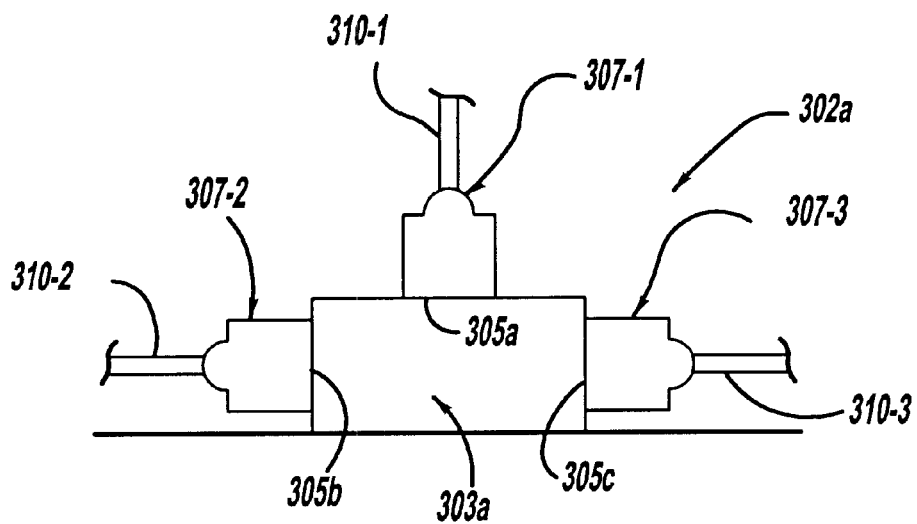
FIG. 3c presents details of the mounting arrangement of the first robot cluster of FIG. 3a and 3b.
Figure 3D:
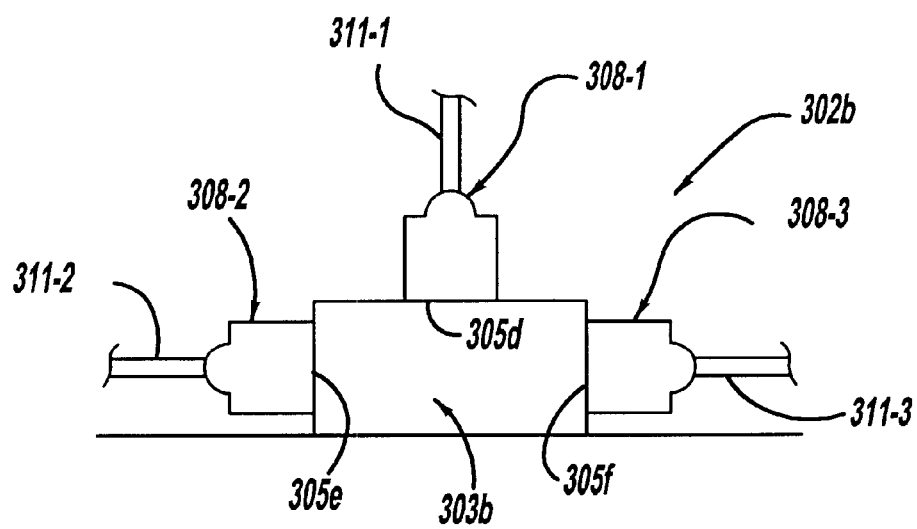
Figure 4A:
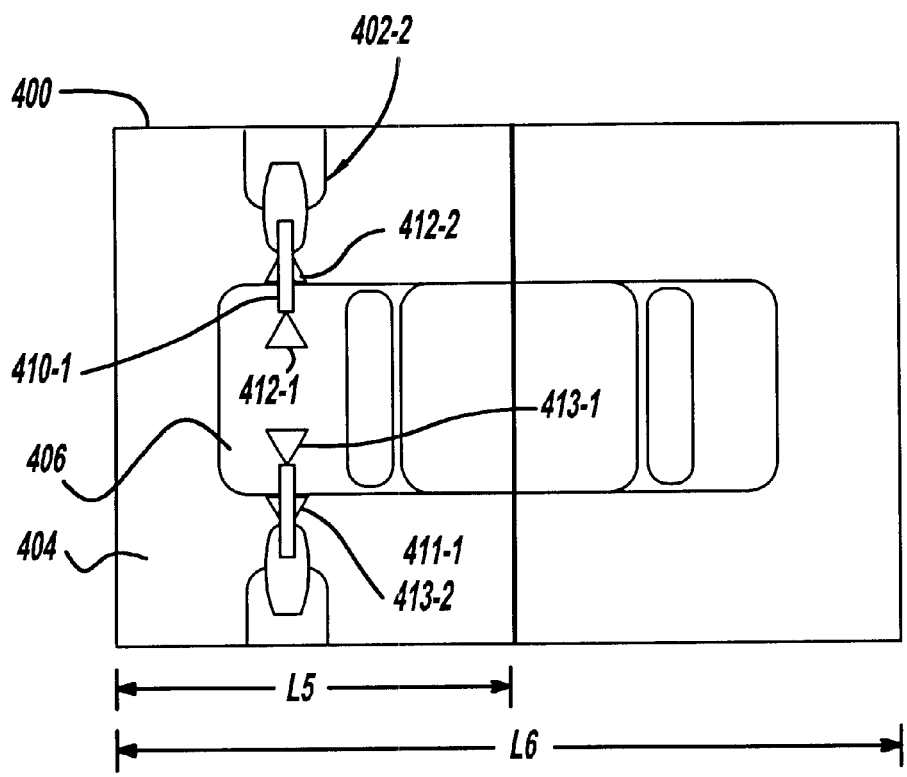
FIG. 4a sets forth a top plan view of a paint application booth arranged in accordance with a third embodiment of the invention.
Figure 4B:
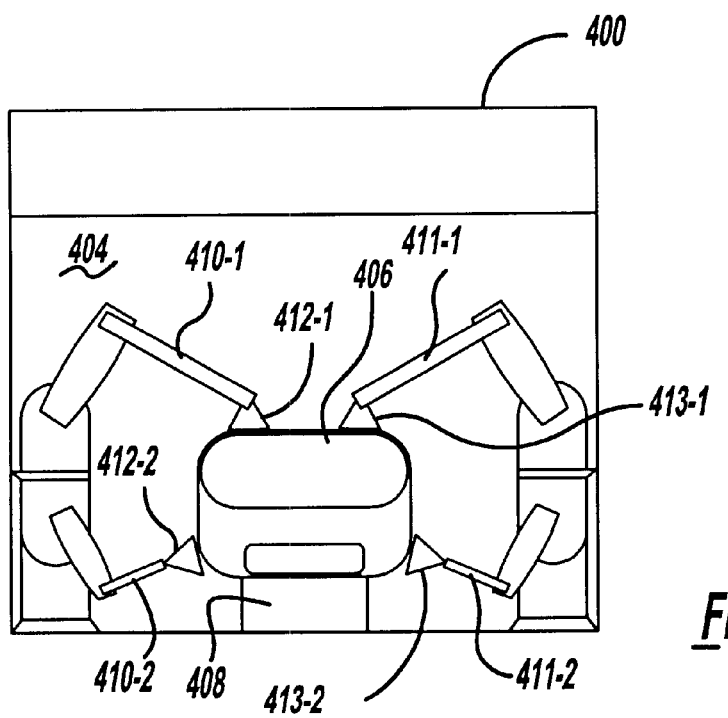
Figure 4C:
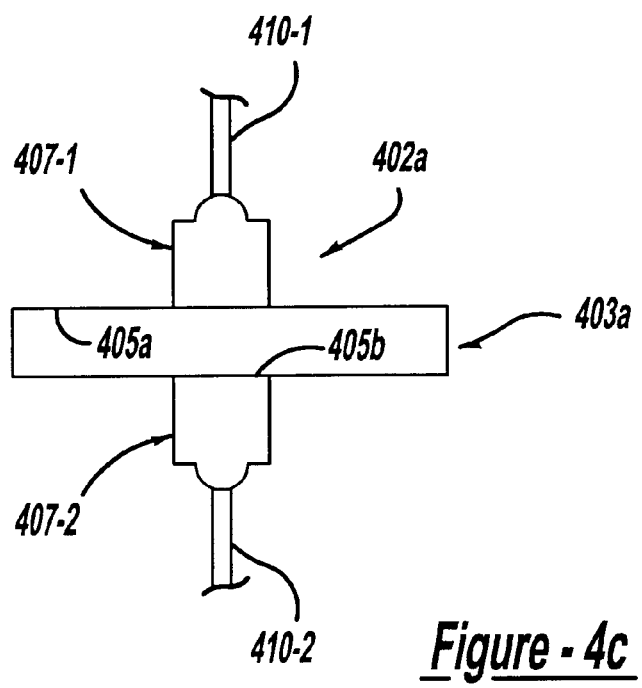
FIG. 4c sets forth details of the mounting arrangement of the first robot cluster of FIGS. 4a and 4b.
Figure 4D:
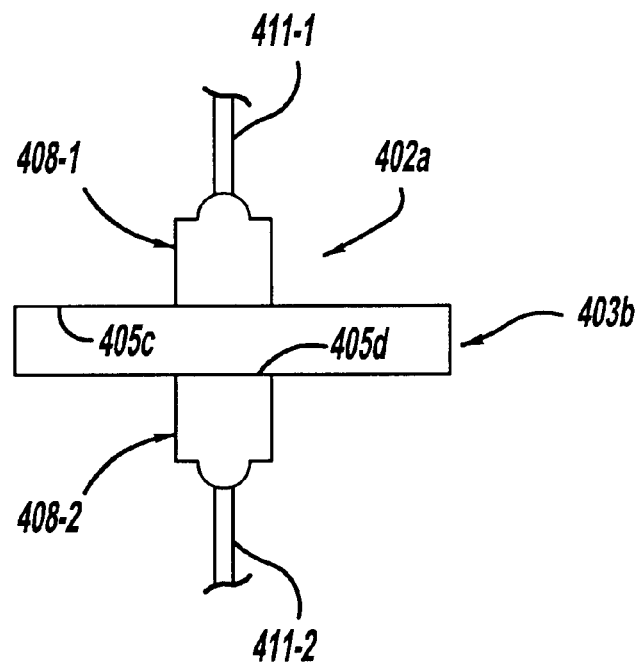
FIG. 4d sets forth the mounting details of the second robot cluster of the booth of FIGS. 4a and 4d.

As seen from FIGS. 3c, 3d each robot cluster 302a, 302b has its individual single arm robot bases mounted to a rectanguloid mounting stand 303a for cluster 302a and 303b for cluster 302b. The individual robots in each cluster are each mounted to mutually perpendicular or noncoplanar surfaces 305a for robot base 307-1, 305B for robot base 307-2, and 305c for robot base 307-3 of cluster 302a. Similarly, as seen from FIG. 3d, common stand 303b presents three surfaces—305d for mounting the base of robot 308-1, 305e for mounting the base of robot 308-2 and 305f for mounting the base of robot 308-3.

Each robot of the cluster has coupled thereto a manipulator arm—310-1 for robot 307-1, 310-2 for robot 307-2, 310-3 for robot 307-3, 311-1 for robot 308-1, 311-2 for robot 308-2 and 311-3 for robot 308-3.

Also associated with each robot cluster is a plurality of paint application devices, with one or more application devices being associated with each robot manipulator arm. For cluster 302a, the paint distribution or application devices are designated 312-1, 312-2 and 312-3 associated respectively with manipulator arms 310-1, 310-2 and 310-3. Similarly, paint distribution or application devices 313-1, 313-2 and 313-3 are respectively associated with manipulator arms 311-1, 311-2 and 311-3 of cluster 302b. As used herein, the term "paint distribution or application" refers to a process wherein a liquid or powder substance is applied to surfaces of an object, such as a car body.

With the arrangement of FIGS. 3a–d, as with the first embodiment, the required length L3 of the paint application zone 304 is substantially smaller than that required, L4, for the prior art type of robot arrangement.

At least one middle robot of each cluster, 307-1 for cluster 302a and 308-1 for cluster 302b, is equipped with arms of the longest reach of the plurality of arms in each cluster. This longest arm 310-1 and 311-1 is responsible for coating the highest vertical surface of body 306 and most of its horizontal surfaces, such as the roof of the body. The two side robots of each cluster 307-2, 307-3 for cluster 302a and 308-2, 308-3 for cluster 302b are rotated 90° from their normal orientation such that their vertical arms have become horizontal and almost parallel with the length of the booth. This orientation makes both side robots in each cluster completely free in their reciprocative motion over the vertical and lower horizontal surfaces of the object 306. The two side robots of each cluster can be equipped with different or with the same arm lengths depending upon a specific coating process and the shape of the workpiece being coated. Additionally, the side robots can be mounted at any angle between 0° and 180° with respect to the middle robot.

The embodiment of FIGS. 3a–d presents a compromise in the required line length. The common base 303a and 303b of the three robot clusters becomes wider and the motion envelopes require more length of spray booth application zone L3, as compared to the length L1 of FIG. 2a, but the robot manipulator arms as arranged in FIGS. 3a–d are given more freedom and flexibility in programming of their required paths of travel. In any case, the required application zone length L3 remains considerably shorter than the conventional required length of the prior art L4. As an additional advantage, this embodiment can be comprised of commercially available single arm robots, thus avoiding the need for a new special design of a single robot base having a plurality of manipulator arms.

A second alternative arrangement set forth in FIGS. 4a, 4b, 4c and 4d represents an attempt to further reduce the number of robot manipulator arms per cluster from three to two where each two robot cluster set has two robots placed on opposing surfaces of a common carrier, preferably on top and underneath in a vertical arrangement as shown.

With reference to FIGS. 4a–d, booth 400 includes two robot clusters 402a and 402b mounted on opposite sides of conveyor system 408 in a paint application zone 404, along which a workpiece, such as an automotive body 406 is transported.

In the embodiment of FIGS. 4A–D, each paint application robot cluster 402a, b comprises a set of two single armed robots—407-1 and 407-2 for cluster 402a and 408-1 and 408-2 for cluster 402b. As seen from FIGS. 4c and 4d, the individual robots of each cluster are mounted on top of one another and facing in opposite directions utilizing a common mounting stand, 403a for cluster 402a having mounting surfaces 405a and 405b facing in opposite directions and respectively mounting the bases of robots 407-1 and 407-2. Similarly, common mounting stand 403b for cluster 402b presents oppositely facing mounting surfaces 405c and 405d for respectively mounting bases for robots 408-1 and 408-2.

Cluster 402a is equipped with two manipulator arms, 410-1 and 410-2, while cluster 402b has manipulator arms 411-1 and 411-2 likewise extending in opposite directions at their bases. Each arm of each cluster is equipped with a paint application or distribution device 412-1 for arm 410-1, 412-2 for arm 410-2, 413-1 for arm 411-1 and 413-2 for arm 411-2.

Again, the required application zone 404 length L5 is seen to be substantially shorter, on the order of one-half of the required length L6 which must be provided for prior art arrangements using horizontally-spaced individual arm robots in accordance with the prior art.

The longer arm of each cluster—410-1 and 411-1 is mounted above the common stand and is responsible for the horizontal surfaces and upper vertical surfaces of body 406. The shorter arms 410-2 and 411-2 are responsible for the lower portions of the vertical surfaces of the body 406.

Whether or not one can reduce the number of manipulator arms in each cluster depends upon the available application throughput of the paint application devices 412.

The invention has been described with reference to preferred embodiments which are presented for the sake of example only. Those skilled in the relevant art will readily recognize that one could combine the various embodiments set forth herein. For example, the embodiments of FIGS. 3a–d and FIGS. 4a–d could be combined by adding the side robot arms 310-2, 310-3 and 311-2 and 311-3 to the common mounting stands 403a and 403b of the embodiment of FIGS. 4a–d. This arrangement would comprise four manipulator arms per cluster and would be suitable for very high production capacities.

The scope and spirit of the invention is to be determined by appropriate interpretation of the appended claims.

What is claimed is:

1. In a paint finishing booth having a paint application zone, an arrangement of paint application robots comprising:
   a robot cluster comprising a plurality of commonly controlled robots, each equipped with a single manipulator arm and each mounted to a different surface of a common mounting stand having at least first and second nonparallel mounting surfaces with a first robot having a first manipulator arm mounted to the first mounting surface and a second robot having a second manipulator arm mounted to the second mounting surface, and each arm equipped with at least a paint application device and positioned within the paint application zone for applying paint at a first side of a workpiece being transported through the application zone.

2. The arrangement of claim 1 wherein the first and second arms have different respective lengths.

3. In a paint finishing booth having a paint application zone, an arrangement of paint application robots comprising:
   a robot cluster comprising a plurality of commonly controlled robots, each equipped with a single manipulator arm and each mounted to a different surface of a common mounting stand having first and second substantially oppositely facing mounting surfaces with a first robot having a first manipulator arm mounted to the first mounting surface and a second robot having a second manipulator arm mounted to the second mounting surface, and each arm equipped with at least a paint application device and positioned within the paint application zone for applying paint at a first side of a workpiece being transported through the application zone.

4. The arrangement of claim 3 wherein the first and second arms have different respective lengths.

5. In a robotic system for performing predetermined operations under direction of a controller, the system comprising:
   clustering a plurality of single manipulator arm robots such that each of the plurality is coupled to a common mounting stand having first and second nonparallel mounting surfaces, with a first robot having a first manipulator arm mounted to the first mounting surface and a second robot having a second manipulator arm mounted to the second mounting surface and with at least two of the plurality of arms performing like operations.

6. The improvement of claim 5 wherein the first and second arms have different respective lengths.

7. In a robotic system for performing predetermined operations under direction of a controller, the system comprising:
   clustering a plurality of single manipulator arm robots such that each of the plurality is coupled to a common mounting stand having first and second oppositely facing mounting surfaces with a first robot having a first manipulator arm mounted to the first mounting surface and a second robot having a second manipulator arm mounted to the second mounting surface and with at least two of the plurality of arms performing like operations.

8. The improvement of claim 7 wherein the first and second arms have different respective lengths.

* * * * *